(12) United States Patent
Brotto

(10) Patent No.: US 7,112,900 B2
(45) Date of Patent: Sep. 26, 2006

(54) METHOD AND SYSTEM FOR SENSING SWITCH POSITION TO PREVENT INADVERTENT STARTUP OF A MOTOR

(75) Inventor: Daniele C Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 308 days.

(21) Appl. No.: 10/696,449

(22) Filed: Oct. 29, 2003

(65) Prior Publication Data

US 2004/0155529 A1    Aug. 12, 2004

Related U.S. Application Data

(63) Continuation-in-part of application No. 10/360,957, filed on Feb. 7, 2003.

(51) Int. Cl.
    *H02H 11/00*    (2006.01)
(52) U.S. Cl. .......................... 307/326; 361/92
(58) Field of Classification Search ............... 307/326; 361/92
    See application file for complete search history.

(56) References Cited

U.S. PATENT DOCUMENTS

| | | | |
|---|---|---|---|
| 3,881,081 A | | 4/1975 | Schilling et al. |
| 3,903,456 A | * | 9/1975 | Schaefer ....................... 361/24 |
| 4,006,334 A | | 2/1977 | Robotham et al. |
| 4,258,368 A | | 3/1981 | Arnold et al. |
| 4,280,026 A | | 7/1981 | Alessio |
| 4,444,091 A | | 4/1984 | Jorgensen, Jr. |
| 4,451,865 A | | 5/1984 | Warner et al. |
| 4,466,040 A | * | 8/1984 | Barthel et al. ............... 361/92 |
| 4,628,233 A | * | 12/1986 | Bradus ...................... 388/809 |
| 4,853,821 A | | 8/1989 | Lewis |
| 4,970,355 A | | 11/1990 | Haeusslein et al. |
| 5,254,916 A | * | 10/1993 | Hopkins ..................... 318/443 |
| 5,654,595 A | | 8/1997 | Ferguson |
| 5,723,914 A | * | 3/1998 | Nakayama et al. ......... 307/125 |
| 6,153,838 A | | 11/2000 | Wadge |
| 6,208,042 B1 | | 3/2001 | Solis |
| 6,285,096 B1 | | 9/2001 | Müller et al. |
| 2002/0101210 A1 | * | 8/2002 | Boisvert et al. ............. 318/469 |
| 2002/0189831 A1 | * | 12/2002 | Carrier ....................... 173/217 |
| 2003/0042859 A1 | | 3/2003 | Gorti et al. .................. 318/275 |
| 2003/0117095 A1 | | 6/2003 | Gorti .......................... 318/275 |

FOREIGN PATENT DOCUMENTS

DE    19616851 A1  *  10/1996
JP    60174079 A   *   9/1985

* cited by examiner

*Primary Examiner*—Brian Sircus
*Assistant Examiner*—Daniel Cavallari
(74) *Attorney, Agent, or Firm*—Harness, Dickey & Pierce, P.L.C.

(57) ABSTRACT

A method for preventing sudden inadvertent operation of a motor of a tool or appliance when the motor is initially electrically connected to a power source while an On/Off switch for controlling the motor is in a closed (i.e. 'On') position. The method includes electrically connecting the motor to a power source and determining a position of the On/Off switch when the motor is initially electrically connected to the power source. The position of the On/Off switch is determined by either sensing whether current is flowing through the motor or voltage is present at the motor when the motor is initially connected to the power source.

50 Claims, 4 Drawing Sheets

METHOD AND SYSTEM FOR SENSING SWITCH POSITION TO PREVENT INADVERTENT STARTUP OF A MOTOR

CROSS-REFERENCE TO RELATED APPLICATIONS

This application is a Continuation-In-Part application of U.S. patent application Ser. No. 10/360,957 filed on Feb. 7, 2003. The disclosure of the above application is incorporated herein by reference.

FIELD OF INVENTION

The invention relates generally to control systems for electric motors, and more particularly to a control system and method for preventing inadvertent startup of the motor when the motor is initially connected to a power source while an On/Off switch controlling the motor is being held in an 'On' position.

BACKGROUND OF THE INVENTION

Typically, in motor driven devices, such as power tools and household appliances, if the device is connected to a power source with an On/Off switch of the device in the 'On' position, the motor of the device would suddenly startup. If the sudden startup of the motor was inadvertent and unexpected by a user of the device, damage to other objects in the vicinity of the tool, or to the tool itself, could occur. Some known methods of preventing such inadvertent startup have used dedicated circuitry connected to the On/Off switch of the motor driven device to directly monitor the position of the On/Off switch and prevent the motor from starting if power is connected to the tool or appliance while the On/Off switch is in the 'On' position. Other known methods have utilized separate devices to prevent such inadvertent startup. With such separate devices, the motor driven device is connected to a first device and the first device is connected to the power source. The first device disconnects the power source from the motor driven device when inappropriate conditions occur. The use of such known methods and devices, however, incur additional expense, inconvenience, and additional interconnects.

It would therefore be desirable to provide a system and method for preventing the inadvertent startup of a motor driven device when power is initially provided to the device if the On/Off switch of the device is in the 'On' position, but that does not present the problems and additional cost described above.

BRIEF SUMMARY OF THE INVENTION

A method and system in accordance with an aspect of the invention prevents inadvertent startup of a motor when the motor is initially connected to a power source with a motor control (i.e., On/Off) switch controlling the motor in the "On" position. The method determines whether the On/Off switch is in the On position when the motor is initially connected to the power source by sensing an electrical parameter of the motor. In an aspect of the invention, the electrical parameter of the motor is whether current is flowing through the motor. In another aspect of the invention, the electrical parameter is whether voltage is present at the motor.

In an aspect of the invention, the system also includes an electronic switch for switching the motor on and off and a controller that determines whether the motor control switch is on or off when the motor is initially connected to the power source. The controller also controls how much power is provided to the motor based on the position of the motor control switch when the motor is initially connected to the power source.

BRIEF DESCRIPTION OF THE DRAWINGS

The present invention will become more fully understood from the detailed description and accompanying drawings, wherein.

DETAILED DESCRIPTION OF THE INVENTION

Figure 1:
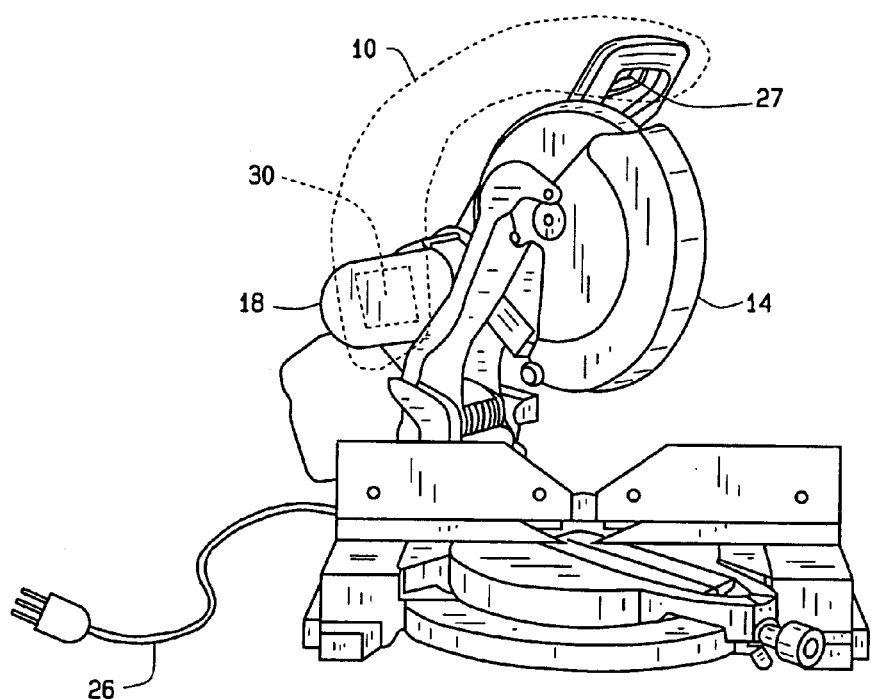
FIG. 1 is a simplified illustration of an exemplary electric power tool incorporating the system and method of the present invention for preventing inadvertent startup of a motor of the tool when power is first coupled to the tool while the tool's On/Off switch is in the 'On' position.

FIG. 1 is a highly simplified illustration of a system 10 of the present invention included in a motor driven device 14 for preventing inadvertent startup of the motor driven device 14 when power is initially provided to the motor driven device 14. In this embodiment of the present invention, the system 10 prevents the operation of a motor 18 included in the motor driven device 14 if the motor 18 is initially connected to a power source when a motor control switch 22, also known as an On/Off switch or trigger, is in a closed (i.e. 'On') position.

The motor 18 provides force, such as torque or linear force, utilized by the motor driven device 14 to perform a function, for example rotate a blade of a mitre saw or spin a drill bit of a drill. It will be appreciated that although motor driven device 14 is shown in FIG. 1 as a mitre saw, motor driven device 14 can be any electromechanical device that utilizes force provided by an electric motor to perform an intended mechanical function. For example, motor driven device 14 could also comprise a power tool, such a table saw, a circular saw, a drill, a belt sander, or an appliance such a mixer, a blender, a can opener, food processor, or an automated knife. Additionally, it will be appreciated that although FIG. 1 shows the motor driven device 14 having a power cord 26 for providing AC power to the motor 18, motor driven device 14 could be a portable motor driven device that utilizes DC power, such as provided by a battery, to operate the motor 18. Thus, the system 10 is applicable with AC and DC powered motor driven devices 14. In this regard, while motor 18 is described as an AC motor, it could instead be a DC motor. For example, the motor 18 could be an AC or DC powered universal motor, a permanent magnet motor, or a linear motor.

The system 10 includes a controller 30 and the motor control switch 22. The controller 30, which may illustratively be a control module, is preferably suitable for use with a plurality of motor driven tools or appliances, such as motor driven device 14, that utilize a plurality of different motors having different operating specifications and different operational parameters specific to the particular application of the motor 18.

Figure 2:
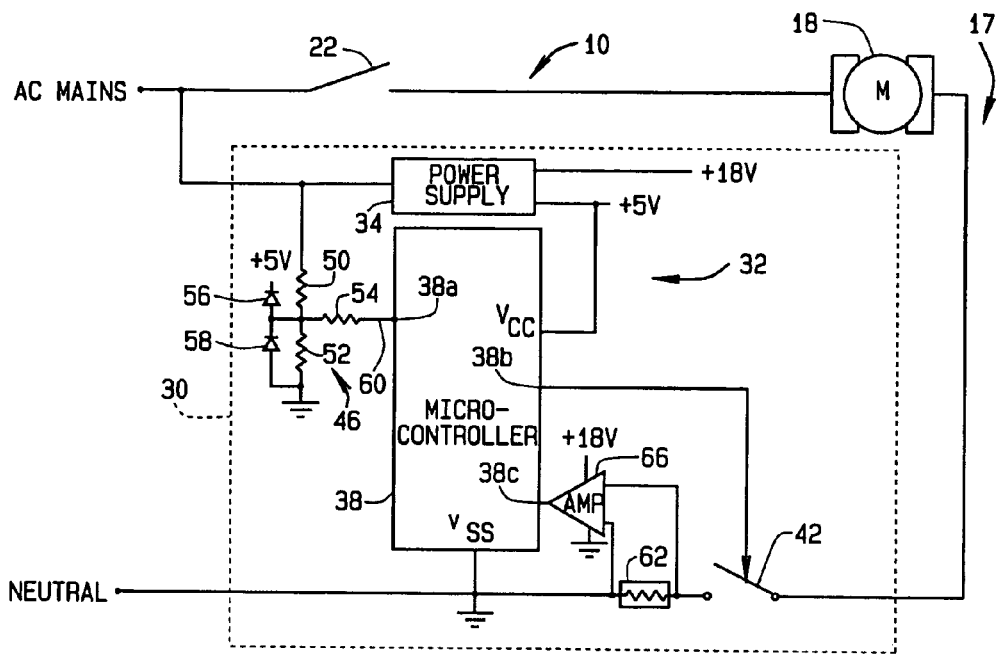
FIG. 2 is a simplified electrical schematic of the system shown in block form in FIG. 1, wherein the system is connectable to an AC power source and an AC motor of the exemplary tool.

FIG. 2 is a simplified electrical schematic of the system 10 (shown in FIG. 1), connectable to an AC power source and the motor 18, wherein the motor 18 is an AC motor, in accordance with an embodiment of the present invention. The controller 30 includes a control circuit, generally indicated at 32, that determines a position of the motor control switch 22 and controls an amount of power provided to the motor 18 based on the position of the motor control switch 22. In an embodiment, the control circuit 32 includes a power supply 34 that supplies power to a microcontroller 38 programmed to control an electronic switch 42, such as a triac, a field effect transistor (FET), an insulated gate bipolar transistor (IGBT), a silicone-controlled rectifier (SCR), or a voltage control device. Microcontroller 38 can be any suitable microcontroller. One microcontroller especially well suited for use with system 10 is an AT26 microcontroller commercially available from ATMEL, Inc. of San Jose, Calif.

System 10 includes motor circuit 17 having motor 18 connected in series with motor control switch 22, electronic switch 42 and shunt resistor 62 between hot and neutral (common) sides of the power source. In the embodiment shown in FIG. 2, one side of motor 18 is connected to the power source, such as to the hot side of AC mains via the power cord 26 (shown in FIG. 1), through motor control switch 22 and the other side of the motor 18 is connected through electronic switch 42, shunt resistor 62 and power cord 26 to the neutral side of the AC mains. Electronic switch 42 and shunt resistor 62 illustratively are also included in controller 30. The controller 30 further includes a voltage divider circuit 46 having resistors 50, 52, 54, and clamping diodes 56 and 58 utilized by microcontroller 38 to sense zero crossing of the AC voltage. The voltage divider circuit 46 is coupled via a circuit line 60 to microcontroller 38 at port 38*a*. The resistors 50, 52, and 54 divide the AC source voltage to a voltage level usable by microcontroller 38, and the clamping diodes 56 and 58 protect microcontroller 38 from damage if a voltage spike occurs in the AC source voltage. It should be understood that all or part of voltage divider circuit could be included in microcontroller 38. For example, the AT26 microcontroller has internal clamping diodes at port 38*a*.

Controller 30 further includes an output port 38*b* coupled to electronic switch 42. Controller 30 is electrically coupled to motor circuit 17 by, in the embodiment of FIG. 2, amplifier 66. Amplifier 66 has a first input coupled to one side of shunt resistor 62 and a second input coupled to the other side of shunt resistor 62. An output of amplifier 66 is coupled to an input port 38*c* of microcontroller 38.

Operation of the motor 18 is controlled by the controller 30. To control operation of the motor 18, the controller 30 controls the current flowing through or voltage applied to motor 18, or both, via electronic switch 42 controlled by microcontroller 38. One function of the controller 30 is to monitor the position of the motor control switch 22 and prevent starting of the motor 18 if power is applied to motor 18 with the motor control switch 22 in a closed (i.e. 'On') position.

The controller 30 is powered-up whenever the power cord 26 is connected to an AC power source, regardless of the position of the motor control switch 22. When the controller 30 is powered-up, microcontroller 38 senses zero crossing of the AC voltage at a port 38*a* and begins to operate the electronic switch 42 via signals output from a port 38*b*. In an embodiment, the electronic switch 42 is a triac. For exemplary purposes, with regard to FIGS. 2–6, the electronic switch 42 will be referred to as triac 42.

Microcontroller 38 measures the divided voltage from the AC power source and determines a zero crossing of the AC voltage from the measured voltage. Alternatively, the voltage divider circuit 46 is illustratively configured to provide a "digital" signal to port 38*a* of microcontroller 38 that transitions upon a zero crossing of the AC voltage, or replaced with a circuit that provides such a digital signal.

In an embodiment, when microcontroller 38 senses a zero crossing of the AC voltage, microcontroller 38 immediately begins attempting to fire triac 42 at a low conduction angle, for example between 160° and 175° for the positive half cycle and between 340° and 355° for the negative half cycle. The conduction angle may be derived from an analog representation of the AC voltage produced at port 38*a* by voltage divider circuit 46 or determined via time delays posted at the zero crossing of the AC signal at port 38*a*. For current to be flowing through the motor 18 and the triac 42, motor control switch 22 must be in the closed position. However, regardless of whether current is flowing through the motor 18 and the triac 42, when the controller 30 is first powered-up, that is, when the motor is initially connected to the AC power source, microcontroller 38 attempts to fire the triac 42 at a low conduction angle. Therefore, if the motor 18 is inadvertently or unexpectedly connected to the AC power source with the motor control switch 22 in a closed position, the triac 42 is being fired at a sufficiently low conduction angle such that power provided to the motor is insufficient for the motor to function normally. Thus, regardless of the position of the motor control switch 22, the motor 18 of the motor driven device 14 will not suddenly be pulsed on when being initially connected to the AC power source.

Substantially simultaneously with beginning to fire the triac 42 at a low conduction angle, microcontroller 38 is programmed to determine whether the motor control switch 22 is in an open or closed position (i.e. 'On' or 'Off'). If the motor control switch 22 is in the closed or On position, control unit 30 controls triac 42 so that motor 18 is not energized, or is energized at a sufficiently low level that it only "hums" but does not turn, as discussed below.

In an embodiment, to determine the position of the motor control switch 22 microcontroller 38 is programmed to sense whether current is flowing through the motor 18. In the embodiment of FIG. 2, microcontroller 38 senses whether current is flowing through the motor 18 by monitoring a voltage across a shunt resistor 62 provided to port 38*c* through amplifier 66. In the embodiment shown in FIG. 2, the value of shunt resistor 62 is sufficiently small that amplifier 66 is required to amplify the voltage across shunt resistor 62 to a level that can be sensed by microcontroller 38 at port 38*c*. It should be understood, however, that a shunt resistor 62 having a larger resistance value can be used in which case the voltage across shunt resistor 62 is directly presented to microcontroller 38, such as by connecting the junction between one side of triac switch 42 and one side of shunt resistor 62 to port 38*c* of microcontroller 38. It should also be understood that microcontroller 38 could include an internal amplifier that is used in lieu of amplifier 66.

In the embodiment of FIG. 2, the voltage signal provided at port 38*c* is an analog signal. However, alternatively, a separate subsystem could be employed to measure the voltage across shunt resistor 62 and to present a digital signal at port 38*c* to indicate whether current is flowing through the motor 18. Additionally, although FIG. 2 shows the triac 42, the shunt resistor 62 and the amplifier 66 as being included in the controller 30, it should be understood that triac 42, the shunt resistor 62 and the amplifier 66, or any combination of them, could be external to the controller 30.

As discussed above, when the motor 18 is initially connected to the AC power source, microcontroller 38 attempts to begin firing the triac 42 at a low conduction angle which prevents the motor 18 from 'jerking' if the motor control switch 22 is closed. If the motor control switch 22 is in fact closed, the firing of the triac 42 allows current to flow through the motor 18, the triac 42, and the shunt resistor 62. As current flows through the motor 18, microcontroller 38 senses the current flow, as described above, and prevents normal operation of the motor 18 until such time as microcontroller 38 determines that the motor control switch 22 has been released to the open or OFF position. However, controller 30 may continue to fire triac 42 at the low conduction angles as discussed above. This energizes motor 18 sufficiently so that it "hums," but does not turn. This alerts the user that the motor control switch 22 must be cycled to achieve normal operation of motor 18. Alternatively, controller 30 may cease firing triac 42 altogether so that no current flows through motor 18. Upon motor control switch 22 then being closed to the On position after it has been released to the Off position, microcontroller 38 operates motor 18 normally.

If the motor control switch 22 is open when AC power is initially applied to the motor 18, no current can flow through the motor 18. Therefore, via the voltage signal monitored at port 38*c*, as described above, microcontroller 38 recognizes that no current is flowing through the motor 18 and enables normal operation of the motor driven device 14. That is, upon a subsequent closure of the motor control switch 22, microcontroller 38 will fire the triac 42 at a conduction angle suitable to produce sufficient power for the motor 18 to function in accordance with desired operational parameters of the motor driven device 14.

Therefore, microcontroller 38 is programmed to attempt to fire the triac 42 at a low conduction angle as the controller 30 is initially powered-up, and to detect closure of the motor control switch 22 very soon thereafter. By only firing the triac 42 at low conduction angles to sense the position of the motor control switch 22, insufficient power is provided to the motor 18 to cause rotation of the motor 18, thereby preventing 'jerking' of the motor 18. Additionally, if microcontroller 38 senses that the motor control switch 22 is closed when power is initially applied to the motor 18, microcontroller 38 disables normal operation of the motor 18 until the motor control switch 22 is opened. Once microcontroller 38 senses that the motor control switch 22 has been opened, microcontroller 38 operates motor 18 normally upon subsequent closure of motor control switch 22.

In an alternative embodiment, microcontroller 38 is not programmed to attempt to fire the triac 42 at a low conduction angle when the controller 30 is first powered-up. Rather, microcontroller 38 immediately begins to attempt to fire the triac 42 at a conduction angle sufficient for the motor 18 to begin to function. Thus, if the motor control switch 22 is closed when the motor 18 is initially connected to the AC power source, the motor 18 will begin to function. However, substantially simultaneous with the powering-up of the controller 30, microcontroller 38 determines the position of the motor control switch 22. Thus, if the motor control switch 22 is closed when the motor 18 is first connected to the AC power source, microcontroller 38 will virtually immediately sense current flowing through the motor 18 and prevent powering on of the motor 18 until the motor control switch is placed in an open position. Thus, the motor 18 will not be powered up if the AC power is initially supplied with the motor control switch 22 in the closed position.

Figure 3:
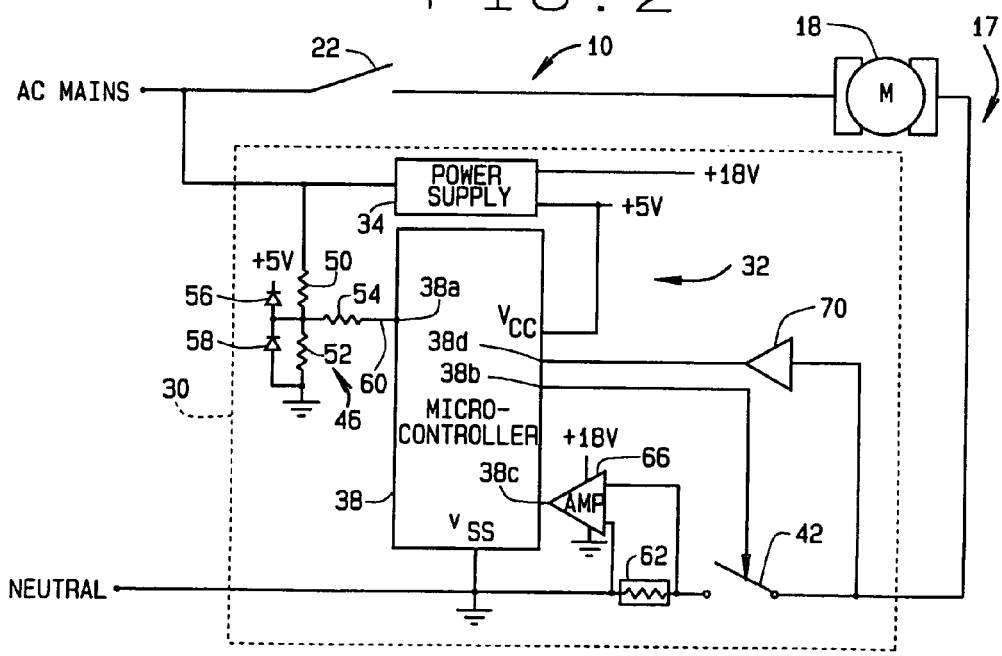
FIG. 3 is a simplified electrical schematic of an alternative embodiment of the system shown in FIG. 2.

FIG. 3 is a simplified electrical schematic of another embodiment in which microcontroller 38 is programmed to sense whether voltage has been applied to the motor 18. In this embodiment, a junction between one side of triac 42 and one side of motor 18 is coupled to a port 38*d* of microcontroller 38 through an amplifier 70 to electrically couple controller 30 to motor circuit 17. The impedance of triac 42 is sufficient to provide a voltage that, after amplification by amplifier 70, can be detected by microcontroller 38 at port 38*d*.

In this embodiment, microcontroller 38 does not attempt to fire triac 42 when microcontroller 38 is first powered-up. Thus, triac 42 is not conducting, which means there is no current flowing when motor 18 is initially connected to the AC power source. However, if motor control switch 22 is in the closed position when motor 18 is initially connected to the AC power source, a voltage will be present at the junction of triac 42 and motor 18 which is sensed by microcontroller 38. Microcontroller 38 then requires the motor control switch 22 to be opened before allowing normal operation of motor 18. If motor control switch 22 is in the open position when motor 18 is initially connected to the AC power source, substantially no voltage will be present at triac 42 and microcontroller 38 operates motor 18 normally upon closing of motor control switch 22.

In an embodiment, upon determining that motor control switch 22 is closed when motor 18 is initially connected to the AC power source, microcontroller 38 can be programmed to fire triac 42 at low conduction angles so that motor 18 hums but does not turn to alert the user that motor control switch 22 must be cycled to operate motor 18 normally.

In an embodiment, microcontroller 38 senses whether voltage is present at triac 42 at a point on the AC voltage waveform other than at zero crossing. Illustratively, microcontroller 38 senses whether voltage is present at triac 42 ninety degrees after a negative to positive zero crossing transition of the AC voltage, which is when the AC voltage will be at its positive peak. It should be understood that microcontroller 38 can sense whether voltage is present at triac 42 over a fairly large angle as long as zero crossing (and close to zero crossing) is avoided. The voltage at zero crossing is zero so that if microcontroller 38 sensed the voltage at triac 42 at a zero crossing it would sense zero voltage even if motor control switch 22 was closed and thus would erroneously determine that motor control switch 22 was open.

Figure 5:
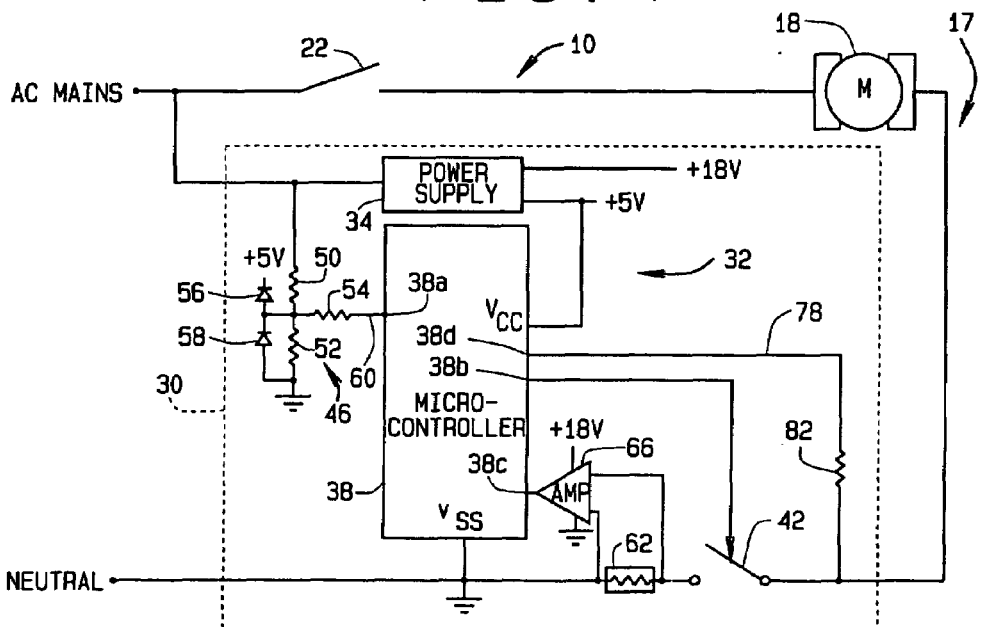
FIG. 5 is a simplified electrical schematic of an alternative embodiment of the system shown in FIG. 1, wherein the system is connectable to an AC power source and an AC motor of the exemplary power tool.

It should be understood that amplifier 70 may be replaced by any other circuit or component suitable to condition the voltage signal for detection by microcontroller 38 at port 38*d*, for example a resistor 82 as shown in FIG. 5. It should also be understood that amplifier 70 may be omitted if microcontroller 38 has internal circuitry, such as an amplifier, suitable to detect voltage at the junction of triac 42 and motor 18. In the embodiment shown in FIG. 3, the shunt resistor 62 and the amplifier 66 are not utilized by microcontroller 38 to sense current flowing through the motor 18, but are rather utilized for other control functions of the motor 18.

Figure 4:
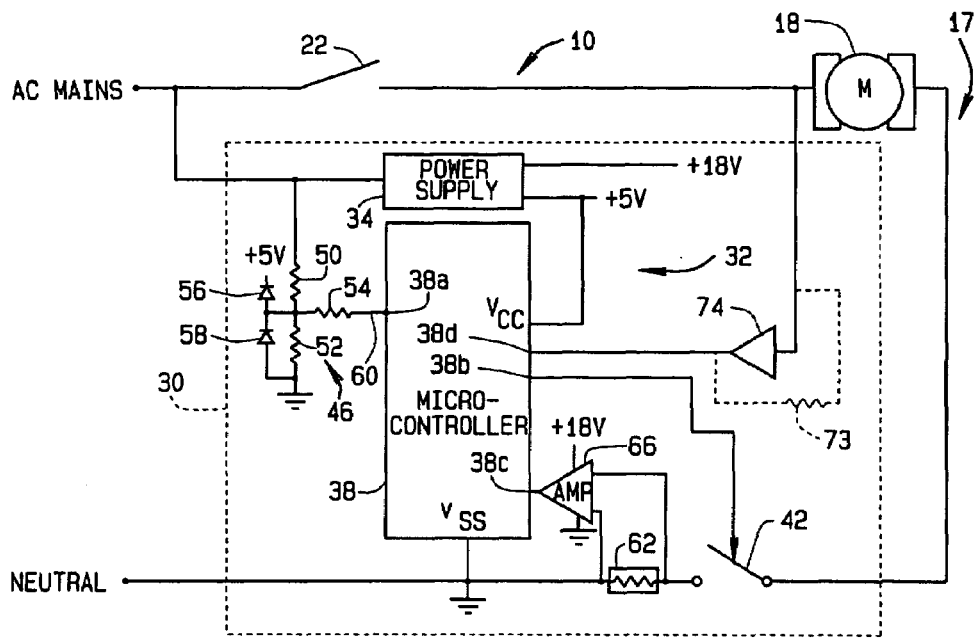
FIG. 4 is another simplified electrical schematic of an alternative embodiment of the system shown in FIG. 2.

FIG. 4 is a simplified electrical schematic of yet another embodiment in which microcontroller 38 is programmed to sense whether voltage has been applied to the motor 18 when AC power is initially applied to the motor 18. In this embodiment, the junction of one side of motor control switch 22 and one side of motor 18 is coupled through an amplifier 74 to port 38*d* of microcontroller 38 instead of the junction between triac 42 and motor 18 to electrically couple motor circuit 17 to controller 30. The impedance of motor 18 is sufficient to create a voltage detected by microcontroller 38 at port 38*d*. The embodiment of FIG. 4 otherwise operates in the same manner as the embodiment of FIG. 3.

It should be understood that amplifier 74 may be replaced by any other circuit or component suitable to condition the voltage signal for detection by microcontroller 38 at port 38*d*, for example resistor 73 as shown in phantom in FIG. 4. It will also be appreciated that the amplifier 74 may be omitted if microcontroller 38 has internal circuitry suitable to detect a voltage across the triac 42. In the embodiment shown in FIG. 4, the shunt resistor 62 and the amplifier 66 are not utilized by microcontroller 38 to sense current flowing through the motor 18, but are rather utilized for other control functions of the motor 18.

FIG. 5 is a simplified electrical schematic of another embodiment of the system 10 (shown in FIG. 1), in which microcontroller 38 is programmed to sense whether voltage is applied to motor 18 when AC power is initially applied to motor 18. The operation of the system 10 in this embodiment is essentially the same as the operation described above in reference to FIG. 3 wherein the position of the motor control switch 22 is determined by sensing whether voltage has been applied to motor 18 by sensing whether voltage is present at the junction between triac 42 and motor 18.

In the embodiment of FIG. 5, the junction of triac 42 and motor 18 is coupled to port 38*d* of microcontroller 38 via a circuit line 78 that includes a resistor 82 to electrically couple controller 30 to motor circuit 17. If the motor control switch 22 is closed when the AC power source is initially applied to the motor 18, microcontroller 38 detects the presence of a voltage signal at port 38*d* and prevents the motor 18 from functioning or functioning normally. Thereafter, microcontroller 38 continues to prevent operation of the motor 18 until microcontroller 38 senses that voltage is no longer applied to motor 18, indicating that the motor control switch 22 has been opened. Once the motor control switch 22 is opened, microcontroller 38 enables normal function of the motor 18 so that motor 18 will operate normally once motor control switch 22 is subsequently closed. Although FIG. 5 illustrates line 78 connected to motor 18 at an electrical node internal to the controller 30, it will be appreciated that circuit line 78 can be connected to the motor 18 at a node external to the controller 30.

Figure 7:
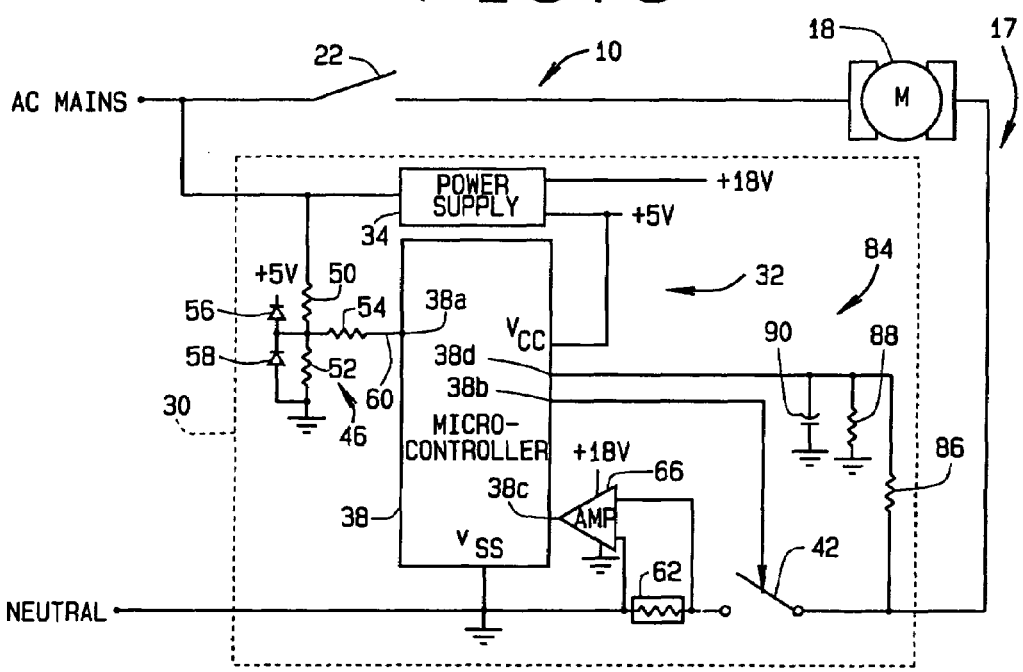
FIG. 7 is a another simplified electrical schematic of an alternative embodiment of the system shown in FIG. 5.

It should be understood that resistor 82 may be replaced by any other circuit or component suitable to condition the voltage signal for detection by the microcontroller 38 at port 38*d*, for example amplifier 70 as shown in FIG. 3. In this regard, in an embodiment, resistor 82 includes a voltage divider circuit 84 as shown in FIG. 7. Voltage divider circuit 84 includes a resistor 86 coupled between the junction of triac 42 and motor 18 and port 38*d*. Voltage divider circuit also includes a resistor 88 and a bypass capacitor 90 coupled in parallel between port 38*d* and ground. Resistor 86 is illustratively a 1 M resistor, resistor 88 a 56 K resistor and capacitor 90 a 1 nf capacitor.

Figure 6:
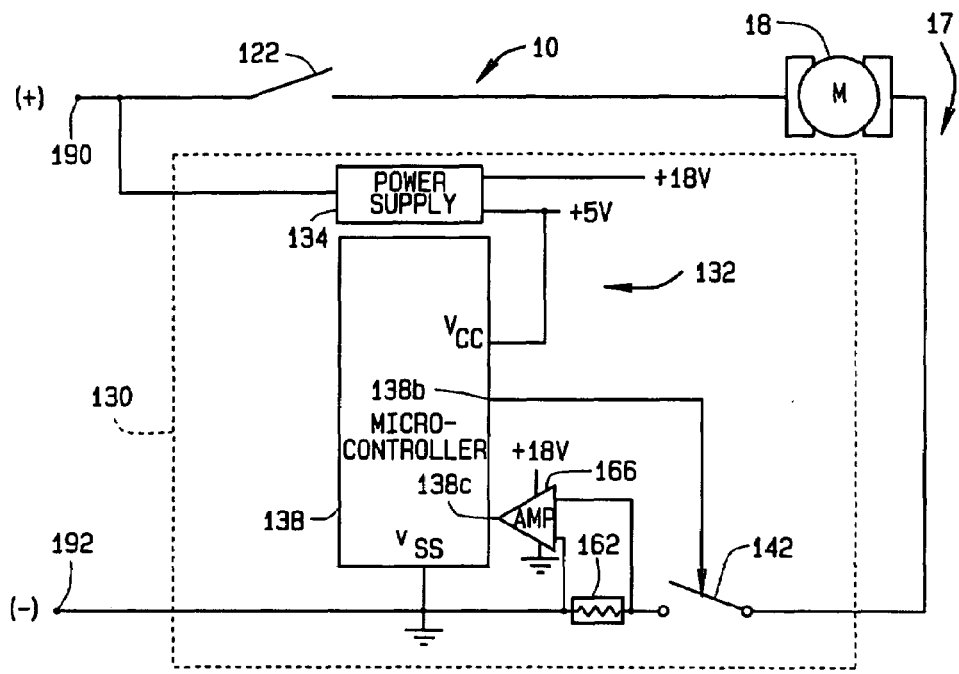
FIG. 6 is a simplified electrical schematic of the system shown in FIG. 1, wherein the system is connectable to a DC power source and a DC motor of an associated power tool.

FIG. 6 is a simplified electrical schematic of a system 100 (shown in FIG. 1) connectable to a DC power source and a DC motor 118, in accordance with an alternative embodiment of the present invention. For clarity and convenience, components of system 100 in FIG. 6 identical to components in FIGS. 2–5 and 7 are identified in FIG. 6 using reference numerals increased by 100. The system 100 functions in a DC application very similar to the way the system 10 of FIGS. 2–5 and 7 functions in the AC application described above. Essentially, the microcontroller 138 prevents initial sudden motor startup, determines whether the motor control switch 122 is in the closed position when DC power is initially applied to the motor 118, and if so, prevents the motor 118 from functioning normally until motor control switch 122 is opened. Upon closing of motor control switch 122 after it has been opened, microcontroller 138 operates motor 118 normally.

In the DC application of system 100, motor circuit 117 includes motor 118 connected in series with motor control switch 122, electronic switch 142 and shunt resistor 162 between a positive terminal 190 of a DC power source and a negative terminal 192 of the DC power source. The controller 130 is powered-up whenever the terminals 190 and 192 are connected to the DC power source. When controller 130 is powered-up, microcontroller 138 senses DC power and begins to attempt to operate the electronic switch 142, via port 138*b*, such that, if current is flowing through the motor 118, insufficient power is provided to the motor 118 for the motor 118 to function normally. In an embodiment, the electronic switch 142 is a transistor, such as a FET or IGBT. For exemplary purposes, with regard to FIG. 6, the electronic switch 142 will be referred to as transistor 142.

In an embodiment, when the motor 118 is initially connected to the DC power source, the microcontroller 138 is programmed to immediately attempt to begin switching transistor 142 at a narrow duty cycle, for example between slightly greater than 0%, such as 0.1%, and 15% duty cycle. For current to be flowing through the motor 118 and the transistor 142, the motor control switch 122 must be in the closed position. Therefore, if the motor 118 is inadvertently or unexpectedly connected to the DC power source with the motor control switch 122 in a closed position, the transistor 142 is being fired at a sufficiently narrow duty cycle such that power provided to the motor 118 is insufficient for the motor to function. Thus, the motor driven device 14 will not 'jerk' due to the motor 118 abruptly beginning to rotate.

Substantially simultaneously to beginning to attempt to fire the transistor 142 at a narrow duty cycle, the microcontroller 138 is programmed to determine whether the motor control switch 122 is in an open or closed position (i.e. 'On' or 'Off'). In various embodiments, similar to the AC embodiments described above, to determine the position of the motor control switch 122, controller 30 is electrically coupled to motor circuit 117, by amplifier 166 in the embodiment of FIG. 6, and the microcontroller 138 is programmed to sense whether current is flowing through the motor 118. For example, the microcontroller 138 senses whether current is flowing through the motor 118 by monitoring a voltage across the shunt resistor 162, the transistor 142, or the motor 118. If current is flowing through the motor 118, indicating the motor control switch 122 is in the closed position when the motor 118 is initially connected to the DC power source, the microcontroller 138 begins to fire the transistor 142 at a narrow duty cycle, thereby preventing the motor 118 from abruptly beginning to rotate. The microcontroller 138 continues to prevent operation of the motor 118 until such time as the microcontroller 138 determines that the motor control switch 122 has been placed in the open (i.e. 'Off') position.

In operation, if the motor control switch 122 is open when DC power is initially applied to the motor 118, no current can flow through the motor 18. Therefore, the microcontroller 138 recognizes that no current is flowing through the motor 18 and enables normal operation of the motor driven device 14. That is, upon a subsequent closure of the motor control switch 122, the microcontroller 138 will fire the transistor 142 at a duty cycle suitable to produce sufficient power for the motor 118 to function in accordance with desired operational parameters of the motor driven device 14. Conversely, if the motor control switch 122 is closed and current flows through the motor 118 when the motor 118 is initially connected to the DC power source, the microcontroller 138 senses the current flow and prevents the motor 118 from functioning. For example, the microcontroller 138 may continue to limit the current flowing through the motor 118 by continuing to fire the transistor 142 at a narrow duty cycle, or the microcontroller 138 may stop firing the transistor 142 altogether so that no current flows through the motor 118. Thereafter, the microcontroller 138 prevents operation of the motor 118 until the microcontroller 138 senses that current is no longer flowing through the motor 118, indicating that the motor control switch 122 has been opened. Once the motor control switch 122 is opened, the microcontroller 138 enables normal functioning of the motor 118 by firing the transistor 142 at a duty cycle suitable to operate the motor 118 in accordance with the operational parameters of the motor driven device 14.

It will be appreciated that although FIG. 6 shows the transistor 142, the shunt resistor 162 and the amplifier 166 as being included in controller 130, which is illustratively a control module, it should be understood that each of the transistor 142, the shunt resistor 162 and the amplifier 166, or any combination of them, could be readily located external to the controller 130.

In another embodiment, similar to the AC embodiment described above in reference to FIGS. 2–5 and 7, to determine the position of the motor control switch 122 the microcontroller 138 is programmed to sense whether a voltage has been applied to motor 118. If, when the motor 118 is initially connected to the DC power source, the microcontroller 138 senses the presence of a voltage at the motor 118, indicating the motor control switch 122 is in the closed position, the microcontroller 138 prevents startup of the motor 118 until such time as the microcontroller 138 determines that the motor control switch 122 has been placed in the open (i.e. 'On') position.

Although the control circuits 32 and 132 have been described above in FIGS. 2–7 to include a microcontroller it will be appreciated that the control circuits 32 and 132 can include any electrical and semiconductor devices suitable to perform the operations described above. That is, the control circuits 32 and 132 can include any electrical and semiconductor devices suitable to determine a position of a motor control switch based on either current flowing through the motors 18, 118 or the presence of a voltage applied to the motor, or both, and control the power provided to the motors 18, 118 based on the position of the motor control switch. For example, control circuits 32, 132 could each include an application specific integrated circuit (ASIC).

Thus, the present invention provides a system that utilizes a controller for a motor of a motor driven device to determine the position of a control switch of the motor driven device and to prevent inadvertent startup of the motor if the device is connected to a power source with the control switch in a closed position. In an embodiment, upon connecting the motor driven device to a power source, the controller operates an electronic switch such that if current is flowing through the motor, the motor will not suddenly startup. Additionally, if the controller senses that current is flowing through the motor when power is first applied, indicating that the motor control switch is closed, the controller continues to prevent the motor from operating, or at least operating normally. The controller then continues to prevent the motor from operating or operating normally until such time as the control circuit senses that current has stopped flowing through the motor, indicating that the motor control switch has been placed in the open (i.e. 'Off') position. In an embodiment, if the controller sensed that the motor control switch was closed when the motor was initially connected to electrical power, it operates the motor at a low level of energization so that it hums but does not turn to alert the user that the motor control switch must be cycled before the motor will operate normally.

In another embodiment, the controller determines the position of motor control switch by sensing whether voltage has been applied to the motor when the motor is initially connected to the electrical power source. The controller then either enables or disables normal operation of the motor based on whether motor control switch is in an open or closed position, in a manner similar to that described above.

While the invention has been described in terms of various specific embodiments, those skilled in the art will recognize that the invention can be practiced with modification within the spirit and scope of the claims.

What is claimed is:

1. In a device having an electrically powered motor and a motor control system for the electrically powered motor having an On/Off switch for switching power to the motor when in an 'On' position, the motor control system having a controller for controlling operation of the motor, a method for preventing startup of the motor when the device is initially electrically connected to a power source with the On/Off switch in the 'On' position, comprising:

applying power to the controller when the device is initially electrically connected to the power source and utilizing the controller to fire an electronic switch to couple the motor to one side of the power source at a level insufficient for the motor to rotate;

determining with the controller whether the On/Off switch is in the 'On" position while the controller is firing the electronic switch to couple the motor to one side of the power source at the level insufficient for the motor to rotate; and utilizing the controller to disable normal operation of the motor when the controller determines that the On/Off switch is in the 'On' position while the controller is firing the electronic switch to couple the motor to one side of the power source at the level insufficient for the motor to rotate.

2. The method of claim 1, wherein utilizing the controller to disable normal operation of the motor comprises utilizing the controller to disable normal operation of the motor until the controller determines the On/Off switch is in an Off position.

3. The method of claim 1, wherein utilizing a controller to determine the position of the On/Off switch includes utilizing the controller to sense whether current is flowing through the motor.

4. The method of claim 1, wherein utilizing a controller to determine the position of the On/Off switch comprises utilizing the controller to sense whether a voltage is applied to the motor.

5. The method of claim 1, wherein electrically connecting the motor to a power source comprises connecting the motor to an AC power source.

6. The method of claim 5, wherein utilizing the controller to fire the electronic switch to couple the motor to one side of the power source at the level insufficient for the motor to rotate includes utilizing the controller to fire the electronic switch to couple the motor to a neutral of the AC power source at a low conduction angle such that power provided to the motor is sufficient for the motor to hum but insufficient for the motor to rotate and utilizing the controller to disable normal operation of the motor includes utilizing the controller to continue to fire the electronic switch to couple the motor to a neutral of the AC power source at the low conduction angle after the controller determines that the On/Off switch was in the On position.

7. The method of claim 5, wherein utilizing the controller to fire the electronic switch to couple the motor to one side of the power source at a level insufficient for the motor to rotate includes utilizing the controller to fire the electronic switch to couple the motor to a neutral of the AC power source at a low conduction angle such that power provided to the motor is insufficient for the motor to rotate, the method further including utilizing the controller to sense zero crossing of the AC power and upon sensing a zero crossing of the AC power, utilizing the controller to determine whether the On/Off switch is in the 'On' position.

8. The method of claim 7, wherein utilizing the controller to fire the electronic switch at the low conduction angle when the device is initially electrically connected to the AC power source includes utilizing the controller to fire the electronic switch at the low conduction angle when the controller senses zero crossing of the AC power.

9. The method of claim 7, wherein utilizing the controller to disable normal operation of the motor comprises utilizing the controller to disable normal operation of the motor until the controller determines that the On/Off switch is in an 'Off' position.

10. The method of claim 1, wherein electrically connecting the motor to a power source comprises electrically connecting the motor to a DC power source.

11. The method of claim 10, wherein utilizing the controller to fire the electronic switch to couple the motor to one side of the power source at the level insufficient for the motor to operate includes utilizing the controller to switch an electronic switch that couples the motor to a common of the DC power source at a narrow duty cycle such that power provided to the motor is sufficient for the motor to hum but insufficient for the motor to rotate.

12. The method of claim 10, wherein utilizing the controller to disable normal operation of the motor comprises utilizing the controller to disable normal operation of the motor until the controller determines the On/Off switch is in an 'Off' position.

13. A system for preventing inadvertent startup of a motor when a device having the motor is initially electrically connected to a power source while the motor is in an 'On' operational status, the system comprising:

an On/Off switch coupled between the motor and a first side of an electrical power source that switches electrical power to the motor;

an electronic switch coupled between the motor and a second side of the electrical power source;

a controller configured to determine a position of the On/Off switch when the motor is initially connected to the power source and disabling normal operation of the motor if the On/Off switch is in a position switching electrical power to the motor when the motor is initially connected to the power source; and a shunt resistor in series with the electronic switch and the second side of the electrical power source, wherein to determine the position of the On/Off switch, the controller is further configured to monitor voltage across the shunt resistor, thereby sensing whether current is flowing through the motor.

14. The system of claim 13, wherein the motor is electrically connected to an AC power source.

15. The system of claim 14 wherein the controller is further configured to fire the electronic switch at a low conduction angle when the device is initially connected to the AC power source such that the power provided to the motor is sufficient for the motor to hum but insufficient for the motor to rotate.

16. The system of claim 14 wherein the controller is further configured to fire the electronic switch at a low conduction angle when the device is initially connected to the AC power source such that the power provided to the motor is insufficient for the motor to rotate, the controller further configured to sense zero crossing of the AC power and upon sensing a zero crossing of the AC power, determining whether the On/Off switch is in the 'On" position.

17. The system of claim 16 wherein the controller is configured to fire the electronic switch at the low conduction angle when the motor is initially electrically connected to the AC power source by firing the electronic switch at the low conduction angle when the controller senses zero crossing of the AC power.

18. The system of claim 14, wherein the controller is further configured to:
disable normal operation of the motor when the On/Off switch is determined to be in a closed position switching power to the motor when the motor is initially connected to the AC power source; and
continue to disable normal operation of the motor until the controller determines that the On/Off switch has been placed in an OFF position where it is not switching electrical power to the motor.

19. The system of claim 13, wherein the motor is electrically connected to a DC power source.

20. The system of claim 19 wherein the controller is further configured to switch the electronic switch at a narrow duty cycle when the motor is initially connected to the DC power source, such that the power provided to the motor is sufficient for the motor to hum but insufficient for the motor to rotate.

21. The system of claim 19, wherein the controller is further configured to:
disable normal operation of the motor when the On/Off switch is determined to be a closed position when the motor is initially connected to the DC power source; and
continue to disable normal operation of the motor until the controller determines that the On/Off switch has been placed in an open position.

22. A power tool, comprising:
a motor circuit having an electric motor, an On/Off switch, and an electronic switch coupled in series between a hot side and a common side of an electric power source when the power tool is connected to the electrical power source;
a controller electrically coupled to the motor circuit, the controller, upon the power tool being initially connected to the electrical power source, firing the electronic switch to couple power to the motor at a level insufficient for the motor to rotate; and
the controller, while firing the electronic switch to couple power to the motor at the level insufficient for the motor to function normally, sensing whether the On/Off switch is in an 'On' position where it is switching electrical power to the motor when the power tool is initially connected to the electrical power source and disabling normal operation of the motor upon sensing that the On/Off switch is in the 'On' position when the power tool is initially connected to the electrical power source, the controller continuing to disable normal operation of the motor while firing the electronic switch to couple power to the motor at the level insufficient for the motor to rotate until the controller senses that the On/Off switch has been switched to an 'Off' position and operating the motor in normal operation once the On/Off switch is switched to the 'On' position after it has been switched to the 'Off' position.

23. The power tool of claim 22 wherein the motor circuit includes a shunt resistor connected in series with the motor and the electrical power source, the controller electrically coupled to the shunt resistor and sensing whether current is flowing therethrough, the controller sensing that the On/Off switch is in the 'On' position upon sensing that current is flowing through the shunt resistor.

24. The power tool of claim 23 wherein the electric power source is a source of AC power, the controller firing the electronic switch at a low conduction angle when the power tool is initially connected to the AC power source to couple power to the motor at the level insufficient for the motor to function normally, the controller sensing zero crossing of the AC power once the power tool is initially connected to the AC power source and sensing whether current is flowing through the shunt resistor once it has sensed the zero crossing of the AC.

25. The power tool of claim 24 wherein the controller fires the electronic switch at a low conduction angle such that the power provided to the motor is sufficient to make the motor hum but insufficient for the motor to rotate.

26. The power tool of claim 24 wherein the controller fires the electronic switch at the low conduction angle upon sensing zero crossing of the AC power.

27. The power tool of claim 23 wherein the electric power source is a source of DC power, the controller firing the electronic switch at a low duty cycle when the power tool is initially connected to the DC power source to couple power to the motor at the level insufficient for the motor to function normally.

28. The power tool of claim 27 wherein the controller fires the electronic switch at a low duty cycle such that the power provided to the motor is sufficient to make the motor hum but insufficient for the motor to rotate.

29. The power tool of claim 23 wherein the On/Off switch is coupled between a first side of the motor and the hot side of the electrical power, a first side of the electronic switch coupled to a second side of the motor, and the shunt resistor coupling a second side of the electronic switch to the common side of the electrical power source.

30. The power tool of claim 22 wherein the controller is electrically coupled to the motor circuit to sense whether voltage is applied to the motor when the power tool is initially connected to the source of electrical power and sensing whether the 'On/Off' switch is in the 'On' position upon sensing that voltage is applied to the motor.

31. The power tool of claim 22 wherein the On/Off switch is connected between a first side of the motor and the hot side of the electrical power source, and the electronic switch is connected between a second side of the motor and the common side of the electrical power source, the controller electrically coupled to at least one of a junction between the first side of the motor and the On/Off switch and a junction between the second side of the motor and the electronic switch.

32. The power tool of claim 31 wherein the controller is electrically coupled to the at least one junction by an amplifier.

33. The power tool of claim 31 wherein the controller is electrically coupled to the at least one junction by at least one resistor.

34. The power tool of claim 31 wherein the electronic switch is coupled to the common side of the electric power source through a shunt resistor.

35. The power tool of claim 31 wherein the electric power source is a source of AC power, the controller firing the electronic switch at a low conduction angle upon sensing that the On/Off switch is in the 'On' position when the power tool is initially connected to the AC power source such that power provided to the motor is sufficient for the motor to hum but insufficient for the motor to rotate.

36. The power tool of claim 31 wherein the electric power source is a source of DC power, the controller firing the electronic switch at a low duty cycle upon sensing that the On/Off switch is in the 'On' position when the power tool is initially connected to the DC power source such that power provided to the motor is sufficient for the motor to hum but insufficient for the motor to rotate.

37. A method of preventing inadvertent startup of a motor of a power tool when the power tool is initially connected to an electric power source, the motor connected in a motor circuit in series with an On/Off switch and an electronic switch, the method comprising upon the power tool being initially connected to the electric power source firing the electronic switch to couple power to the motor at a level insufficient for the motor to function normally, sensing whether the On/Off switch is in an 'On' position when the power tool is initially connected to the electric power source while firing the electronic switch to couple power to the motor at the level insufficient for the motor to function normally, and upon sensing that the On/Off switch is in the 'On' position when the power tool is initially connected to the electric power source, disabling normal operation of the motor until the On/Off switch is switched to an 'Off' position and operating the motor normally upon the On/Off switch being switched to the 'On' position after having been switched to the 'Off' position.

38. The method of claim 37 wherein the power tool includes a controller electrically coupled to the motor circuit and sensing whether the 'On/Off' switch is in the 'On' position when the power tool is initially connected to the electric power sources includes utilizing the controller to sense whether at least one of current is flowing through the motor circuit and voltage is applied to the motor.

39. In a motor control system for an electrically powered motor having On/Off switch for switching power to the motor when in an 'On' position, the motor control system having a controller for controlling operation of the motor, a method for preventing startup of a motor when a device having the motor is initially electrically connected to AC power source with the On/Off switch in the 'On' position, comprising:
- utilizing the controller to fire an electronic switch that couples the motor to a neutral of the AC power source at a low conduction angle when the motor is initially electrically connected to the AC power source such that power provided to the motor is insufficient for the motor to rotate;
- utilizing the controller to sense zero crossing of the AC power and upon sensing a zero crossing of the AC power, utilizing the controller to determine whether the On/Off switch is in the 'On' position; and
- utilizing the controller to disable normal operation of the motor when the controller determines that the On/Off switch is in the 'On' position when the motor is initially electrically connected to the power source.

40. The method of claim 39, wherein utilizing the controller to disable normal operation of the motor comprises utilizing the controller to disable normal operation of the motor until the controller determines the On/Off switch is in an Off position.

41. The method of claim 39, wherein utilizing the controller to fire the electronic switch at the low conduction angle when the motor is initially electrically connected to the AC power source includes utilizing the controller to fire the electronic switch at the low conduction angle when the controller senses zero crossing of the AC power.

42. The method of claim 39, wherein utilizing the controller to disable normal operation of the motor comprises utilizing the controller to disable normal operation of the motor until the controller determines that the On/Off switch is in an 'Off' position.

43. A system for preventing inadvertent startup of a motor when a device having the motor is initially electrically connected to an AC power source while the motor is in an 'On' operational status, the system comprising:
- an On/Off switch coupled between the motor and a first side of an electrical power source that switches electrical power to the motor;
- an electronic switch coupled between the motor and a second side of the electrical power source;
- a controller configured to fire the electronic switch at a low conduction angle when the device having the motor is initially connected to the AC power source such that the power provided to the motor is insufficient for the motor to rotate, the controller further configured to sense zero crossing of the AC power and upon sensing a zero crossing of the AC power, determining whether the On/Off switch is in the 'On" position and to disable normal operation of the motor if the On/Off switch is in a position switching electrical power to the motor when the motor is initially connected to the power source; and
- a shunt resistor, wherein to determine the position of the On/Off switch, the controller is further configured to monitor voltage across the shunt resistor, thereby sensing whether current is flowing through the motor.

44. The system of claim 43, wherein when the controller fires the electronic switch at the low conduction angle it does so such that the power provided to the motor is sufficient for the motor to hum but insufficient for the motor to rotate.

45. The system of claim 43 wherein the controller is configured to fire the electronic switch at the low conduction angle by firing the electronic switch at the low conduction angle when the controller senses zero crossing of the AC power.

46. The system of claim 43, wherein the controller is further configured to:
- disable normal operation of the motor when the On/Off switch is determined to be in a closed position switching power to the motor when the device having the motor is initially connected to the AC power source; and
- continue to disable normal operation of the motor until the controller determines that the On/Off switch has been placed in an OFF position where it is not switching electrical power to the motor.

47. A system for preventing inadvertent startup of a motor when a device having the motor is initially electrically connected to an AC power source while the motor is in an 'On' operational status, the system comprising:
- an On/Off switch coupled between the motor and a first side of an electrical power source that switches electrical power to the motor;
- an electronic switch coupled between the motor and a second side of the electrical power source;
- a controller configured to:
  - fire the electronic switch at a low conduction angle when the device having the motor is initially connected to the AC cower source such that the power provided to the motor is insufficient for the motor to rotate, the controller further configured to sense zero crossing of the AC power and upon sensing a zero crossing of the AC power, determining whether the On/Off switch is in the 'On" position; and
  - disable normal operation of the motor if the On/Off switch is in a position switching electrical power to the motor when the device having the motor is initially connected to the AC power source.

48. The system of claim 47, wherein when the controller fires the electronic switch at the low conduction angle such that the power provided to the motor is sufficient for the motor to hum but insufficient for the motor to rotate.

49. The system of claim 47 wherein the controller is configured to fire the electronic switch at the low conduction angle when the motor is initially electrically connected to the AC power source by firing the electronic switch at the low conduction angle when the controller senses zero crossing of the AC power.

50. The system of claim 47, wherein the controller is further configured to
- continue to disable normal operation of the motor until the controller determines that the On/Off switch has been placed in an OFF position where it is not switching electrical power to the motor.

* * * * *